United States Patent [19]

Freiburger

[11] Patent Number: 4,463,622
[45] Date of Patent: Aug. 7, 1984

[54] TRANSMISSION AND REVERSE GEAR SYNCHRONIZING THEREFOR

[75] Inventor: Thomas W. Freiburger, Davenport, Iowa

[73] Assignee: Deere & Company, Moline, Ill.

[21] Appl. No.: 349,935

[22] Filed: Feb. 18, 1982

Related U.S. Application Data

[63] Continuation-in-part of Ser. No. 111,315, Jan. 11, 1980, abandoned.

[51] Int. Cl.³ .................. F16H 5/06; F16H 57/10; F16H 3/08
[52] U.S. Cl. .................. 74/337.5; 74/411.5; 74/331; 192/4 A
[58] Field of Search .............. 74/337.5, 335, 331, 74/411.5; 192/4 A

[56] References Cited

U.S. PATENT DOCUMENTS

| | | | |
|---|---|---|---|
| 2,772,652 | 12/1956 | Du Shane et al. | 74/337.5 |
| 2,839,941 | 6/1958 | Rugen | 74/337.5 |
| 2,917,936 | 12/1959 | Fletcher | 74/335 |
| 3,491,862 | 1/1970 | Tanzer | 74/337.5 |
| 3,500,697 | 3/1970 | Schowalter | 74/337.5 |
| 3,589,483 | 6/1971 | Smith | 74/331 |
| 3,654,819 | 4/1972 | Link | 74/360 |
| 3,739,656 | 6/1973 | Williams et al. | 74/337.5 X |
| 3,745,847 | 7/1973 | Worner et al. | 74/411.5 |
| 3,774,475 | 11/1973 | Meysenburg et al. | 74/740 |
| 4,000,662 | 1/1977 | Wolfe | 74/360 X |
| 4,016,773 | 4/1977 | Galas et al. | 74/339 X |
| 4,197,760 | 4/1980 | Wolfe | 74/337.5 X |
| 4,228,694 | 10/1980 | Adam | 74/337.5 X |
| 4,257,284 | 3/1981 | Ashauer et al. | 74/411.5 |
| 4,263,815 | 4/1981 | Ashauer | 74/411.5 |

FOREIGN PATENT DOCUMENTS

| | | | |
|---|---|---|---|
| 0022411 | 1/1981 | European Pat. Off. | 74/411.5 |
| 54-98451 | 8/1979 | Japan | 74/411.5 |
| 2056598 | 3/1981 | United Kingdom | 74/411.5 |

*Primary Examiner*—Allan D. Herrmann
*Assistant Examiner*—D. Wright

[57] ABSTRACT

Reverse gear synchronizing for a transmission of the type commonly used on large off-road vehicles is accomplished without the use of a reverse gear synchronizing clutch. The input shaft of the transmission carries a high and low gear separated by a high/low synchronizer clutch. Also, carried on the input shaft is a reverse gear and conventional clutch. A shift rod has a first shifting collar in shifting communication with the high/low synchronizer clutch and a second shifting collar in communication with the reverse clutch. A cam containing travel channels is in linked communication with the shifting collars such that movement of the cam produces clutch movement to engage the high, low, or reverse gear. The travel channels of the cam are so defined to enable relative movement between the high/low synchronizer and reverse clutch, whereby clashing between the reverse clutch and pin of the reverse gear is eliminated when the transmission gearing is changed from neutral to reverse.

3 Claims, 4 Drawing Figures

TRANSMISSION AND REVERSE GEAR SYNCHRONIZING THEREFOR

CROSS REFERENCE TO RELATED APPLICATION

This application is a continuation-in-part of U.S. application Ser. No. 111,315, filed on Jan. 11, 1980, now abandoned.

BACKGROUND OF THE INVENTION

This invention relates to vehicle transmissions and, more particularly, to a transmission of the multi-range, multi-speed type commonly used in large off-road vehicles.

Current multi-range transmissions used on large off-road vehicles utilize a high/low synchronizer for gear shifting. However, reverse gear shifting is exacted using a conventional gear clutch because of space and cost considerations. When the main clutch assembly is released, the main clutch assembly being the means of transmitting torque to the transmission from the vehicle engine, a resulting drag causes the input shaft to experience a continued torque which in turn causes the reverse gear and reverse clutch to rotate out of synchronization. Therefore, upon shifting the conventional gear clutch to the reverse gear, clashing between the clutch and reverse gear pin results, especially when the vehicle engine is running at a high R.P.M.

This invention provides a means of stopping the reverse gear and gear pin from rotating to prevent clashing when shifting the transmission from neutral to reverse.

SUMMARY OF THE INVENTION

A transmission of the type used on large off-road vehicles generally includes an input shaft or an output shaft, a gear shaft and one or more countershafts. The input shaft carries a high and low gear separated by a high/low synchronizer clutch. Also, carried on the input shaft is a reverse gear and conventional clutch therefor. The gear shaft contains a plurality of gears and clutching means therefor.

Customarily, prior to shifting the vehicle transmission to reverse gearing, the vehicle will be stopped resulting in the output shaft being stopped. Since the gear shaft is in communication with the output shaft, the gear shaft will also be stopped. By momentarily engaging the high gear on the input shaft and, thereby, communicating the input shaft to the gear shaft, the input shaft is stopped. Also, the reverse gear is stopped by motion transmission through the transmission countershafts. The reverse clutch can now engage the reverse gear without clashing between the reverse gear pin and clutch.

To accomplish the desired reverse clutching action, a first shift rod carries a first shift collar in shifting communication with the high/low synchronizer clutch, and a second shift collar in communication with the reverse clutch. Each shift collar includes a travel pin which is placed in a corresponding travel groove on a cam such that movement of the cam dictates the clutching action of the high, low and reverse gears. By proper definition of the travel grooves the desired clutching action can be achieved, gear engagement of the gear shaft being accomplished in the conventional manner.

It is an objective of the present invention to achieve reverse gear synchronizing in a multi-range transmission of the type used in large off-road vehicles without the use of additional synchronizers.

DETAILED DESCRIPTION OF THE PREFERRED EMBODIMENT

Figure 1:
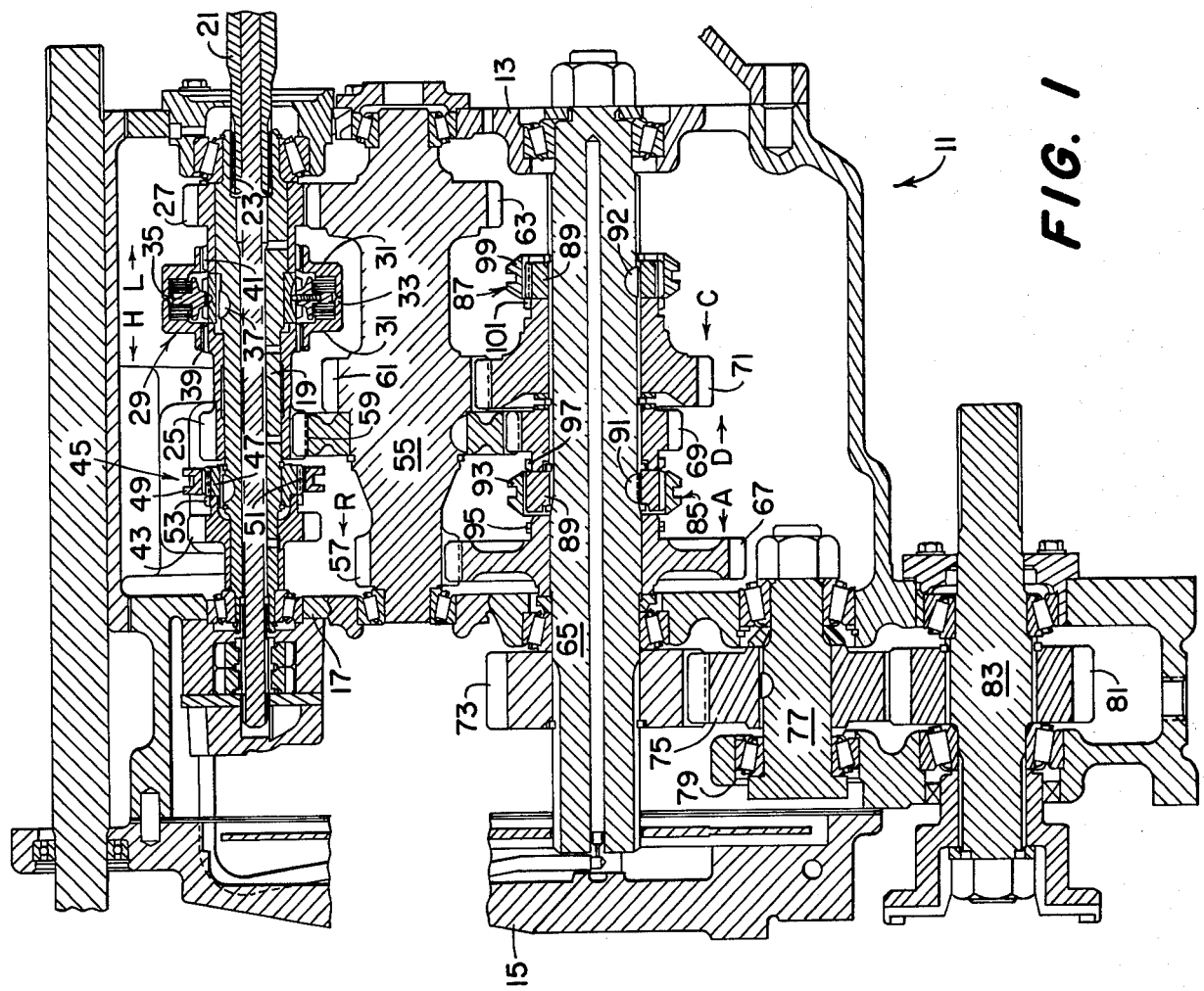
FIG. 1 is a fragmentary elevational view, partly in section, illustrating a transmission.

Illustrated in FIg. 1 is the parallel shaft portion of a multi-range transmission representative of the type used on off-road vehicles. A transmission housing 11 includes a forward and rear wall 13 and 15, respectively. Rotatably mounted to the forward wall 13 and inner wall 17 is an input shaft 19. The input shaft 19 is splined to an input feed shaft 21 at 23. Conventionally, the input feed shaft 21 communicates with a main clutch assembly (not shown) to receive torque from an engine (not shown). It is sometimes customary to communicate the input feed shaft 21 with a planetary gear section to increase the range capability of the transmission.

Carried on the input shaft 19 is a low range or speed input pinion gear 25, and a high range speed or input pinion gear 27. For the purpose of selectively establishing either a low or high range positive engagement between the input shaft 19 and pinions 25 and 27, the transmission includes a dual speed or range selector clutch 29 located between the input pinions 25 and 27. The dual range clutch 29 includes a pair of synchronizer rings 31 located at opposite sides of the synchronizer member 33, the later being splined to a hub 35 as at 37. One of the synchronizer rings 31 is splined as at 39 to the input pinion 25 while the other synchronizer ring 31 is splined as at 41 to the input pinion 27. When the synchronizer rings 31 are shifted in the direction of an arrow L, synchronization occurs between the rear ring 31 and the synchronizer member 33, after which the splined connection at 39 is carried over the spline 37 on the hub 35. Thus, the hub 35, the low range pinion 25 and a rear synchronizing ring 31 are connected for the rotation in unison. This positively connects the low range pinion 25 to the input shaft 19. Shifting the synchronizer ring 31 in the opposite direction, in the direction of an arrow H, first synchronizes the first ring 31 and the synchronizer member 33 and causes positive engagement between the high-range pinion 27 and input shaft hub 35 by means of carrying over the splined connection at 41 to hub splines 37.

Also, carried on the input shaft 19 is a reverse pinion gear 43. A reverse clutch 45 is located on the input shaft 19 between the low speed input pinion 25 and the reverse pinion 43. The reverse clutch 45 includes an internal ring 47 keyed to the shaft 19. An external ring 49 is axially shiftably splined, as at 51 to the interior ring 47 and is shiftable in the direction of the arrow R to drivingly engage teeth 53 located on the hub of the reverse pinion 43.

A main countershaft 55 is rotatably mounted to walls 13 and 17. Main countershaft 55 is shown displaced from its true position in order that the structure thereof may be more readily perceived. Main countershaft 55 carries a small countershaft gear 57, a large countershaft gear 59, a first intermediate countershaft gear 61, and a second intermediate countershaft gear 63, the gear 61 being smaller than the gear 63. The countershaft gear 59 is in constant mesh with the low range pinion 25, and the countershaft gear 63 is in constant mesh with the high-range pinion 27.

A gear shaft 65 is rotatably mounted to walls 13 and 17. Gear shaft 65 has journalled thereon a large gear 67, a small gear 69, and an intermediate gear 71, these gears being respectively in constant mesh with the countershaft gears 57, 59, and 61. The gear shaft 65, also, has an output gear 73 in constant mesh with a gear 75 fixably mounted by any conventional means to a shaft 77 rotatably mounted between wall 17 and interior wall 79, gear 75 being in constant mesh with a gear 81 fixably mounted by any conventional means to a output shaft 83 rotatably mounted between walls 17 and 79. For selectively establishing a positive engagement between the gears 67, 69, 71, and gear shaft 65, gear shaft 65 carries a first and second clutch 85 and 87, which are of similar construction as reverse clutch 45. Specifically, the clutches 85 and 87 include an interior ring 89 keyed to the gear shaft 65 at 91 and 92, respectively. An external ring 93 of clutch 85 is axially slidably splined to the interior ring 89. The external ring 93 is shiftable in the direction of the arrow A to bring the internal splines thereof into driving engagement with teeth 95 of the gear 67. If the exterior ring 93 is shifted to the direction of the arrow D the external ring 93 will drivingly engage teeth 97 of gear 69. Similarly, an external ring 99 is axially shiftably splined to the internal ring 89 of clutch 87 and when shifted in the direction of arrow C will engage teeth 101 to drivably engage gear 71.

Figure 2:
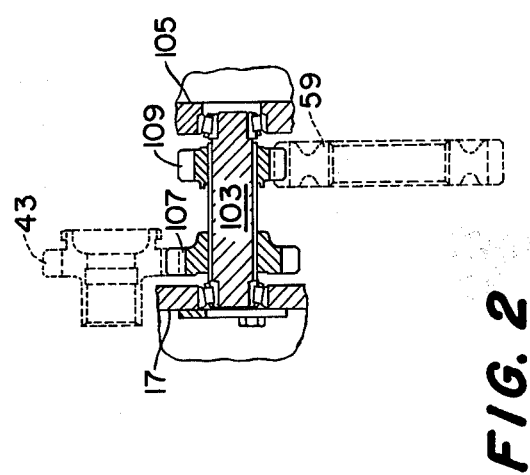
FIG. 2 is a fragmentary elevational view, partly in section, of the transmission reverse countershaft.

Referring to FIG. 2, a reverse countershaft 103 is rotatably mounted between walls 17 and internal wall 105 parallel to and behind input shaft 19. Countershaft 103 carries a first and second gear 107 and 109, respectively. The first gear 107 is in constant mesh with the reverse gear 43 on the input shaft 19 and the second gear 109 is in constant mesh with the gear 59 on the main countershaft 55.

Forward gear selection is attained in the conventional manner well known in the art. By way of illustration, first gear is obtained by sliding external ring 93 in the direction of arrow A to engage teeth 95 of gear 67 and shifting synchronizer 29 in the direction of arrow L, second gear being obtained by shifting synchronizer 29 in the direction of arrow H. It is observed that gear 67 represents first and second gears; gear 71 represents a third and fourth gear; and, gear 69 represents a fifth and sixth gear.

It is observed that, when a vehicle carrying the transmission is stopped, the output shaft 83 will be stopped, thereby bringing the gear shaft 65 to a stop because of the communication between gears 73, 75, and 81. The input shaft 19, even with the main clutch assembly disconnected (clutch assembly not shown), will have a drag effect produced from the engine so that the input shaft 19 remains rotating when the engine is idling. It is customary to have either gear 67, 69, or 71 in engagement to shaft 65 prior to shifting to reverse, therefore countershaft 55 will be stopped. Therefore, motion between gears 59, 109, and 107, and reverse gear 43 is stopped. Because the input shaft 19 experiences a degree of rotation, drag forces will cause the reverse clutch 45 to rotate such that direct shifting of the reverse clutch 45 in the direction of arrow R to engage teeth 53 will produce clashing between the reverse gear teeth 53 and the reverse clutch 45. To eliminate clashing, shifting the synchronizer 29 in either the direction of arrows H or L will cause the input shaft 19 to stroke down by creating a positive communication between input shaft 19 and stopped shaft 55. Once the input shaft 19 has been stroked down, the reverse clutch 45 can be shifted without clashing.

Figure 3:
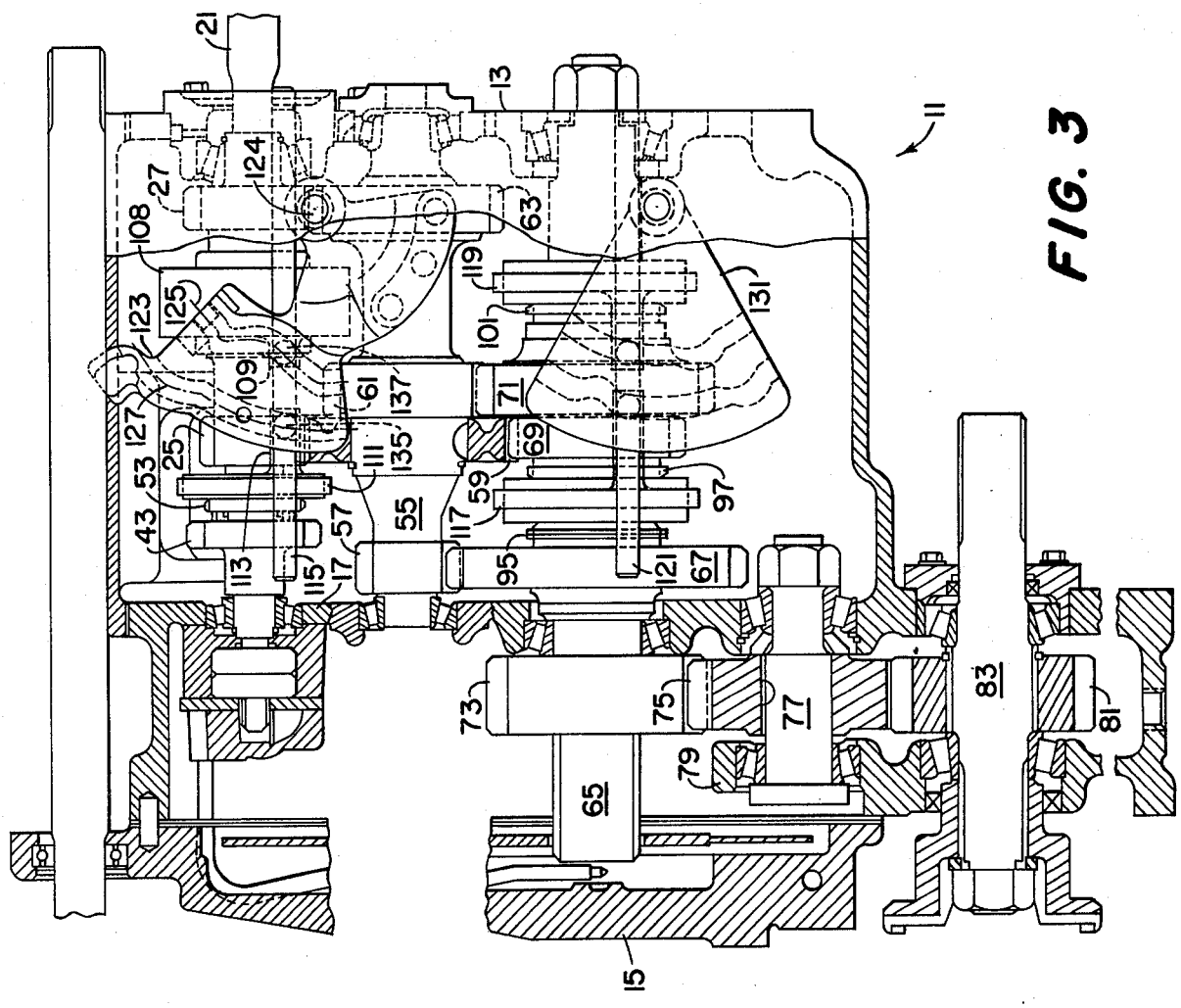
FIG. 3 is a fragmentary elevational view, party in section of the transmission and shifting means.

Referring to FIG. 3, a transmission will further include a shift synchronizer clutch collar 108 having a linking arm 109. The collar is placed around synchronizer clutch 29. A shift collar 111 having a linking arm 113 is placed around clutch 45. A shift rod 115 is passed through a hole in linking arms 109 and 113 and fixably mounted in the transmission by any conventional means parallel to the input shaft 19 such that collars 107 and 109 can slidably move thereon. Third and fourth shift collars 117 and 119, similar to shift collar 111, are slidably mounted on a second shift rod 121 fixably mounted in the transmission by any conventional means mounted parallel to said gear shaft 65, shift collar 117 being placed around clutch 93 and the shift collar 119 being placed around clutch 87.

Figure 4:
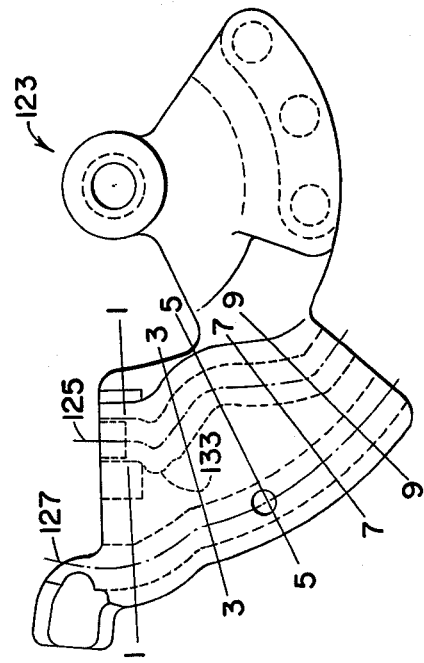
FIG. 4 is an elevated view of a shifting cam.

Referring to FIG. 3, and more particularly to FIG. 4, a first cam 123 is rotatably mounted to the transmission at 124. Cam 123 has a first groove or cam track 125 in which the track rider 137 of linking arm 109 can slidably move therein and a second groove or cam track 127 in which the track rider 135 of linking arm 113 can slidably move therein. The contour of cam tracks 125 and 127 upon rotation of cam 123 defines the clutching action of clutches 29 and 45. Similarly, a cam 131 controls the clutching action of clutches 85 and 87.

Referring to FIG. 4, tracks 125 and 127 of cam 123 are contoured to define a track for clutch riders 135 and 137 to achieve the desired reverse clutching without clashing. The intersection of track 125 and 127 with line 1—1 indicates the location of riders 135 and 137, respectively, to place the transmission in reverse; the intersection of tracks 125 and 127 with line 5—5 indicates the location of riders 135 and 137, respectively, to engage the low gear pinion 25 to shaft 19, the reverse clutch 45 being disengaged; and the intersection of tracks 125 and 127 with line 9—9 indicates the location of followers 135 and 137, respectively, to engage the high gear pinion 27 to shaft 19, the clutch 45 being disengaged. The intersection of tracks 125 and 127 with lines 3—3 and 7—7 indicates a neutral transmission mode. The course of cam track 125 experiences a lateral deformation at 133 of sufficient magnitude to cause the clutch collar 108 to shift the high/low synchronizer clutch 29 to momentarily engage and disengage the high gear 27 just prior to engaging the reverse clutch 111, thereby, deriving the aforedescribed clutching action to eliminate reverse gear clashing.

It is noted that the present invention has been described in reference to a particular transmission, which should be understood as not limiting the scope of the invention. The scope of the present invention is defined by the following claims.

I claim:

1. In combination with a transmission particularly suited for off-road vehicles, said transmission including an input shaft rotatably mounted in said transmission carrying a high and low gear rotatably mounted on said input shaft, high/low synchronizing clutch means for selectively providing synchronized communication between said input shaft and said high gear or said low gear, a reverse gear rotatably mounted on said input shaft, and non-synchronized clutch means for providing driving communication between said input shaft and said reverse gear, an output shaft rotatably mounted in said transmission carrying a fixed gear, a gear shaft rotatably mounted in said transmission carrying a plurality of gears and clutch means for selectively providing driving communication between one of said gears and said gear shaft, and a fixed gear in constant mesh with said fixed gear on said output shaft, a first countershaft rotatably mounted in said transmission having a plurality of fixed gears in constant mesh with a corresponding one of said plurality of gears mounted to said gear shaft, and at least one of said gears on said first countershaft in constant mesh with said high gear on said input shaft and at least one of said gears in constant mesh with said low gear on said input shaft, a second countershaft rotatably mounted in said transmission having a first gear fixably mounted thereon in constant mesh with said reverse gear on said input shaft and a second gear in constant mesh with one of said gears on said first countershaft, first shifting collar means for causing said high/low synchronized clutch means to selectively cause said high gear or said low gear to drivingly communicate with said input shaft, second shifting collar means for causing said reverse clutch to selectively cause said reverse gear to drivingly communicate with said input shaft, first means for selectively causing said clutch means associated with said gear shaft to drivingly engage one of said gears mounted to said gear shaft; wherein the improvement comprises: cam means for communicating with said first shift collar means and said second shift collar means such that movement of said cam means determines the resulting clutch action as predicted by said first and second shift collars, said cam means to dictate a clutching action when said transmission is to be shifted from neutral to reverse such that said high/low range synchronized clutch means is momentarily engaged just prior to engagement of said reverse clutch, said cam means being independently operable with respect to first means such that reverse gear communication is obtainable in combination with any one of said gear in communication with said gear shaft.

2. A transmission as claimed in claim 1 wherein said cam means comprises a cam rotatably mounted to said transmission having a first and second cam track wherein said first shift collar means is in linked communication with said second cam track path and said second shift collar is in linked communication with said first cam track, such that rotation of said cam causes said link communications with said first and second collar to cause the desired clutching action, said first and second travel path so defined to cause said high range gear to be drivingly engaged momentarily just prior to engagement of said reverse clutch when said transmission is to be shifted from neutral to reverse gear.

3. In combination with a transmission particularly suited for off-road vehicles, said transmission including an input shaft rotatably mounted in said transmission carrying a high and low gear rotatably mounted on said input shaft, high/low synchronizing clutch means for selectively providing synchronized communication between said input shaft and said high gear or said low gear, a reverse gear rotatably mounted on said input shaft, and nonsynchronized clutch means for providing driving communication between said input shaft and said reverse gear, an output shaft rotatably mounted in said transmission carrying a fixed gear, a gear shaft rotatably mounted in said transmission carrying a plurality of gears and clutch means for selectively providing driving communication between one of said gears and said gear shaft, and a fixed gear in constant mesh with said fixed gear on said output shaft, a first countershaft rotatably mounted in said transmission having a plurality of fixed gears in constant mesh with a corresponding one of said plurality of gears mounted to said gear shaft, and at least one of said gears on said first countershaft in constant mesh with said high gear on said input shaft and at least one of said gears in constant mesh with said low gear on said input shaft, a second countershaft rotatably mounted in said transmission having a first gear fixably mounted thereon in constant mesh with said reverse gear on said input shaft and a second gear in constant mesh with one of said gears on said first countershaft, first shifting collar means for causing said high/low synchronized clutch means to selectively cause said high gear or said low gear to drivingly communicate with said input shaft, second shifting collar means for causing said reverse clutch to selectively cause said reverse gear to drivingly communicate with said input shaft, first means for selectively causing said clutch means associated with said gear shaft to drivingly engage one of said gears mounted to said gear shaft; wherein the improvement comprises: a cam rotatably mounted to said transmission having a first and second cam track wherein said first shift collar means is in linked communication with said second cam track path and said second shift collar is in linked communication with said first cam track, such that rotation of said cam causes said link communications with said first and second collar means to cause selective communication between said high gear or said low gear and said input shaft, or between said reverse gear and said input shaft, said first and second travel path so defined to cause said high range gear to be drivingly engaged momentarily just prior to engagement of said reverse clutch when said transmission is to be shifted from neutral to reverse gear.

* * * * *